United States Patent
Natarajan

(10) Patent No.: US 6,597,913 B2
(45) Date of Patent: *Jul. 22, 2003

(54) DISTRIBUTED DYNAMIC CHANNEL MANAGEMENT IN CELLULAR SYSTEMS

(75) Inventor: Kadathur S. Natarajan, Mesa, AZ (US)

(73) Assignee: Motorola, Inc., Schaumburg, IL (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 49 days.

This patent is subject to a terminal disclaimer.

(21) Appl. No.: 08/463,534

(22) Filed: Jun. 5, 1995

(65) Prior Publication Data

US 2002/0049039 A1 Apr. 25, 2002

(51) Int. Cl.[7] .............................................. H04Q 7/20
(52) U.S. Cl. ..................... 455/452; 455/12.1; 455/428; 455/453
(58) Field of Search ............................. 455/33.1, 54.1, 455/33.2, 56.1, 62, 34.1, 34.2, 67.3, 226.2, 12.1, 427–430, 452, 453; 379/58, 59, 60

(56) References Cited

U.S. PATENT DOCUMENTS

| | | | | |
|---|---|---|---|---|
| 4,670,899 A | * | 6/1987 | Brody et al. ................ 379/59 |
| 5,379,448 A | * | 1/1995 | Ames et al. ................ 455/34.1 |
| 5,423,062 A | * | 6/1995 | Sakakura .................... 455/34.1 |
| 5,448,621 A | * | 9/1995 | Knudsen ..................... 455/427 |
| 5,499,386 A | * | 3/1996 | Karlsson .................... 455/34.1 |
| 5,512,884 A | * | 4/1996 | Hesse et al. ................ 455/34.1 |
| 5,528,247 A | * | 6/1996 | Nonami ...................... 455/12.1 |
| 5,542,093 A | * | 7/1996 | Bodin et al. ............... 455/34.1 |
| 5,561,838 A | * | 10/1996 | Chandos et al. ........... 455/12.1 |
| 5,579,536 A | * | 11/1996 | Stackman et al. ......... 455/12.1 |

OTHER PUBLICATIONS

Yasuda, Y., Kidou, S., and Macbara, A., "A Channel Management Scheme for Dynamic Assignment on Multi Beam Mobile Satellite Communications Systems". Communications: The Global Bridge., IEEE, vol. 2, 1993, pp. 755–759.*

* cited by examiner

Primary Examiner—Vivian Chin
Assistant Examiner—James K Moore
(74) Attorney, Agent, or Firm—Harold C. McGurk, IV; Frank Bogacz

(57) ABSTRACT

A dynamic channel management method (100) determines which base station (14, 24, 26) is a least utilized base station for servicing a channel request made by a subscriber unit (40). The least utilized base station is based on what base station (14, 24, 26) is more available to handle the channel request. If the least utilized base station can handle the channel request, it assigns and grants a channel to the subscriber unit (40). Otherwise, the channel request is blocked or denied. The dynamic channel management method (100) provides a systematic way for dynamically matching the available channel resources with the actual demand as a function of time. This enables the system (10) to handle significantly more traffic than with pure static channel management schemes.

14 Claims, 3 Drawing Sheets

DISTRIBUTED DYNAMIC CHANNEL MANAGEMENT IN CELLULAR SYSTEMS

TECHNICAL FIELD

This invention relates generally to cellular communications and, in particular, to methods for performing dynamic channel management in a cellular system.

BACKGROUND OF THE INVENTION

Conventional channel management methods are based on the assumption that traffic demands can be accurately predicted both as a function of time and geographic location over the earth. If this assumption was true, it would be possible to estimate how many channels are needed per cell as a function of time and pre-allocate the requisite channels to satisfy the expected demand. In reality, this is a very unlikely situation because actual demand cannot be predicted very accurately because of the stochastic nature of the traffic demands.

There are a few drawbacks of conventional channel management methods which use static assumptions and models. First, there is bandwidth wastage when actual channel or caller demand falls short of the pre-allocated amount. Calls could be better allocated to base stations which are experiencing less than expected caller demand (i.e., under-utilized base stations). Second, there may be bandwidth shortage resulting in blocked and dropped calls when the actual channel demand exceeds the pre-allocated amount. These disadvantages, bandwidth wastage and shortage, are just a few of the problems associated with channel management when based on static or historic caller demands rather than actual traffic demands. Accordingly, there is a significant need for dynamic channel management methods that overcome the disadvantages of static channel management and enables a cellular communication system to be more responsive to actual traffic demand conditions.

DESCRIPTION OF THE PREFERRED EMBODIMENTS

The present invention has utility in monitoring actual traffic demand conditions and determining a least utilized base station for servicing a channel request by a subscriber unit. The present invention also provides a framework for periodic computation and exchange of traffic demand and state information to neighboring base stations. In addition, each of the base stations uses the same algorithm to provide consistent results that improves channel management, allocation and capacity.

A "satellite" means a man-made object or vehicle intended to orbit a celestial body such as earth. The term "satellite" is intended to include both geostationary and orbiting satellites and/or combinations thereof including low-earth, medium-earth and geosynchronous satellites. A "constellation" means an ensemble of satellites arranged in orbits for providing specified coverage (e.g., radio communication, photogrammetry, etc.) of portion(s) or all of the celestial body. A constellation typically includes multiple rings (or planes) of satellites and may have an equal number of satellites in each plane, although this is not essential. The terms "cell," "beam," "zone" and "antenna pattern" are not intended to be limited to any particular mode of generation and include those created by either terrestrial or satellite cellular communication systems and/or combinations thereof.

Figure 1:
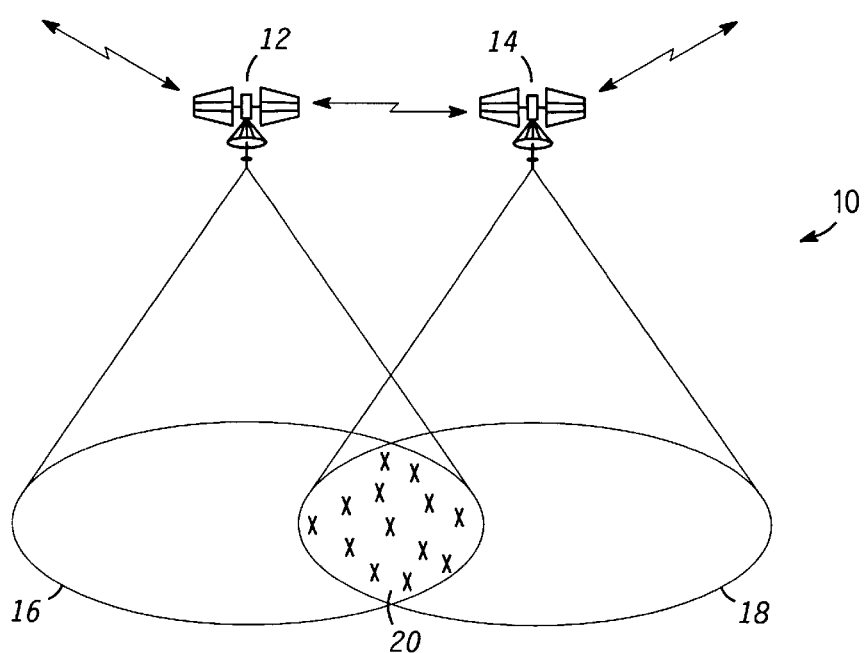
FIG. 1 shows a mobile cellular communication system in a general form.

FIG. 1 shows mobile cellular communication system 10 in a general form. Cellular communication system 10 comprises a set of base stations 12, 14. Base stations 12, 14 may be terrestrial stations in a terrestrial cellular system, or may be a number of satellites orbiting earth. The satellites may have orbits at any angle of inclination (e.g., polar, equatorial or another orbital pattern). The number of satellites, the angle of inclination and how the satellites physically communicate with one another and a number of subscriber units is unimportant for the present invention and well known to those of ordinary skill in the art. Moreover, the present invention is also applicable to satellite constellations where full coverage of the earth is not achieved (i.e., where there are "holes" in the communications coverage provided by the constellation) and constellations where plural coverage of portions of the earth occur (i.e., more than one satellite being in view of a point on the earth's surface).

Generally, communication system 10 may be viewed as a network of nodes. Each base station 12, 14 and subscriber unit ("x's" in FIG. 1) represent a node of communication system 10. All nodes of communication system 10 are or may be in data communication with other nodes of communication system 10 through communication links. In addition, all nodes of communication system 10 are or may be in data communication with other telephonic devices dispersed throughout the world through public service telephone networks (PSTNs) and/or conventional terrestrial cellular telephone devices coupled to a PSTN through conventional terrestrial base stations.

A subscriber gains access to the network or system 10 via one of the base stations 12, 14. At any time instant, base stations 12, 14 provide some type of radio frequency (RF) coverage, represented as cells or zones 16, 18, respectively. Base station 12 provides RF coverage for cell 16, while base station 14 provides RF coverage for cell 18. Each cell 16, 18 provides caller access to subscribers within their coverage area. The actual number of subscriber units that can be served simultaneously within cells 16, 18 depends on the number of channels available from base stations 12, 14, respectively. Base station 12 or 14 may have a fixed number of channels available (independent of time) or a time-varying number of channels available.

For the purpose of providing complete coverage as well as increased accessibility, base stations 12, 14 may provide overlapping RF coverage especially in geographic areas that have high demand for connectivity. The overlapping RF coverage area is shown in FIG. 1 as cell area or region 20. Those of ordinary skill in the art will understand that zones or antenna patterns generally represent regions where a signal level (for example, of the broadcast channel) associated with a cell is greater than some predetermined level, and outside that region, the signal level is less than the predetermined level. In zone area 20, the subscriber units shown by the "x" marks can be assigned a channel by either base station 12 or 14.

The number of local access channels available for simultaneous access by subscribers is limited. In order to handle a large number of users using a limited number of channels, it is important to use good channel management strategies and effectively utilize the available channels. The subscriber units initially determine which cell to communicate with based on the signal level or signal quality of a channel received at the subscriber unit. For example, a subscriber unit located within a center region of a cell or zone would most likely choose to communicate within that cell because the channel signal level of an antenna pattern is generally the greatest in the center region. If a subscriber unit is located within the region where two antenna patterns or cells overlap, the subscriber unit may choose either cell to communicate with because the channel signal levels are generally similar.

Subscriber units may be located anywhere on the surface of the earth or in the atmosphere above earth. Subscriber units are preferably communications devices capable of transmitting data to and receiving data from base stations 12, 14. By way of example, subscriber units may be hand-held, portable cellular telephones adapted to communicate with base stations 12, 14. Ordinarily, the subscriber units do not need to perform any control functions for communication system 10.

Communication system 10 may accommodate any number of subscriber units. In the preferred embodiment of the present invention, the subscriber units communicate with nearby base stations 12, 14 via subscriber links. Subscriber links are a limited portion of the electromagnetic spectrum that may be divided into numerous channels (ring-alert channels, broadcast channels, acquisition channels and traffic channels) and are preferably combinations of L-Band frequency channels. Subscriber links may encompass Frequency Division Multiple Access (FDMA), Time Division Multiple Access (TDMA), Code Division Multiple Access (CDMA) communications or any combination thereof.

Traffic channels are two-way channels that are assigned to particular subscriber units by base station 12 or 14 from time to time. Assignments of traffic channels to subscriber units are valid only for as long as the subscriber unit remains within the cell. In the preferred embodiment of the present invention, a digital format is used to communicate data over the channels to support real-time communications. Preferably, at least one traffic channel is assigned for each call, and each traffic channel has sufficient bandwidth to support, at a minimum, a two-way voice or data conversation. To support real-time communications, a time division multiple access (TDMA) scheme is desirably used to divide time into frames. Particular traffic channels are assigned particular transmit and receive time-slots. Analog audio signals are digitized so that an entire frame's signal is transmitted or received in a single short high speed burst during an allotted time-slot. Preferably, each base station 12, 14 supports a large amount of traffic channels so that each base station 12, 14 can simultaneously service any number of independent calls. Those skilled in the art, however, will recognize that traffic channels can be formed without this specific time-slot structure and that methods that do not require digitizing the analog voice signal may be employed. The precise method used to form the channels and to process the voice communication is not important to this invention. Moreover, while the specific communication technique (i.e. method of allocating the communication resource) is not important for the present invention, those of skill in the art will understand that any one or combination of the above described communication techniques can be used in the present invention.

Each base station 12 or 14 communicates with other nearby base stations through a cross-link. These cross-links form a backbone of communication system 10. Thus, a call or communication from one subscriber unit located at any point on or near the surface of the earth may be routed through base stations 12, 14 (or a constellation of satellites) to within range of substantially any other point on the surface of the earth. A communication may be routed down to a subscriber unit (which is receiving the call) on or near the surface of the earth from base station 12 or 14.

Figure 2:
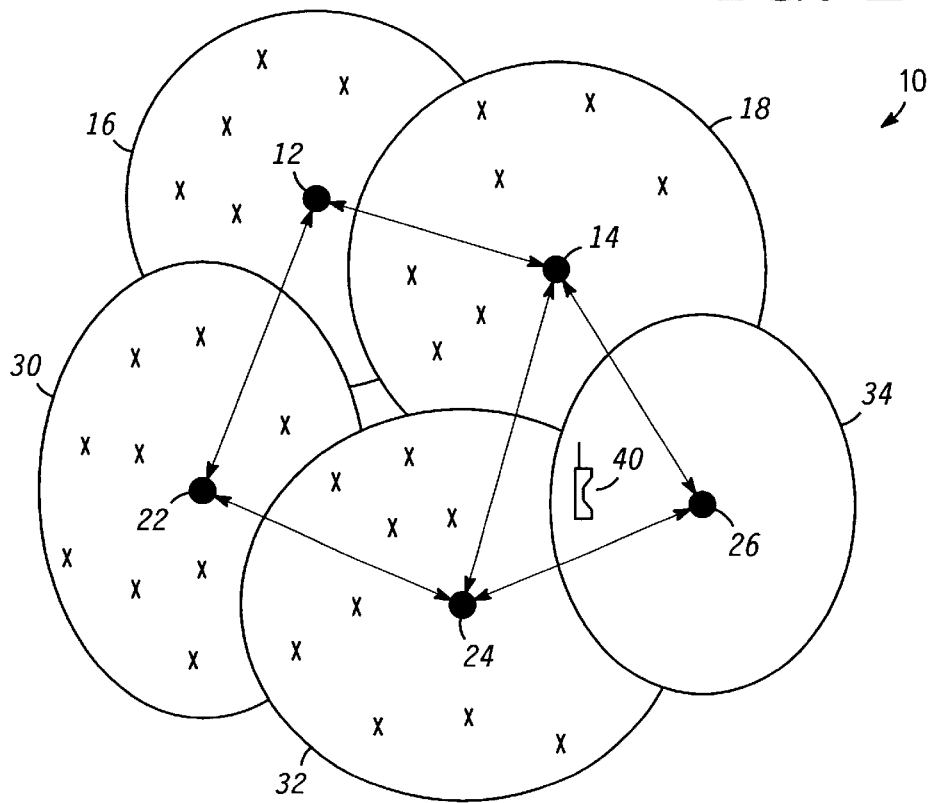
FIG. 2 shows an example of a network with five cells.

FIG. 2 shows an example of network 10 with five cells. As shown in FIG. 2, there are five base stations 12, 14, 22, 24 and 26. Base station 12 projects cell 16, base station 14 projects cell 18, base station 22 projects cell 30, base station 24 projects cell 32, and base station 26 projects cell 34. Cells 16, 18, 30, 32 and 34 may also be referred to as zones. An "x" shown in FIG. 2 is a subscriber unit. Subscriber units in some overlapping areas have potential access to multiple base stations. Subscriber unit 40 shown in FIG. 2 can be assigned a channel by one of the three base stations 14, 24 or 26. Although the shape of the cells or zones shown in FIG. 2 is elliptical or circular, the cell shape can be any shape for purposes of the present invention.

Figure 3:
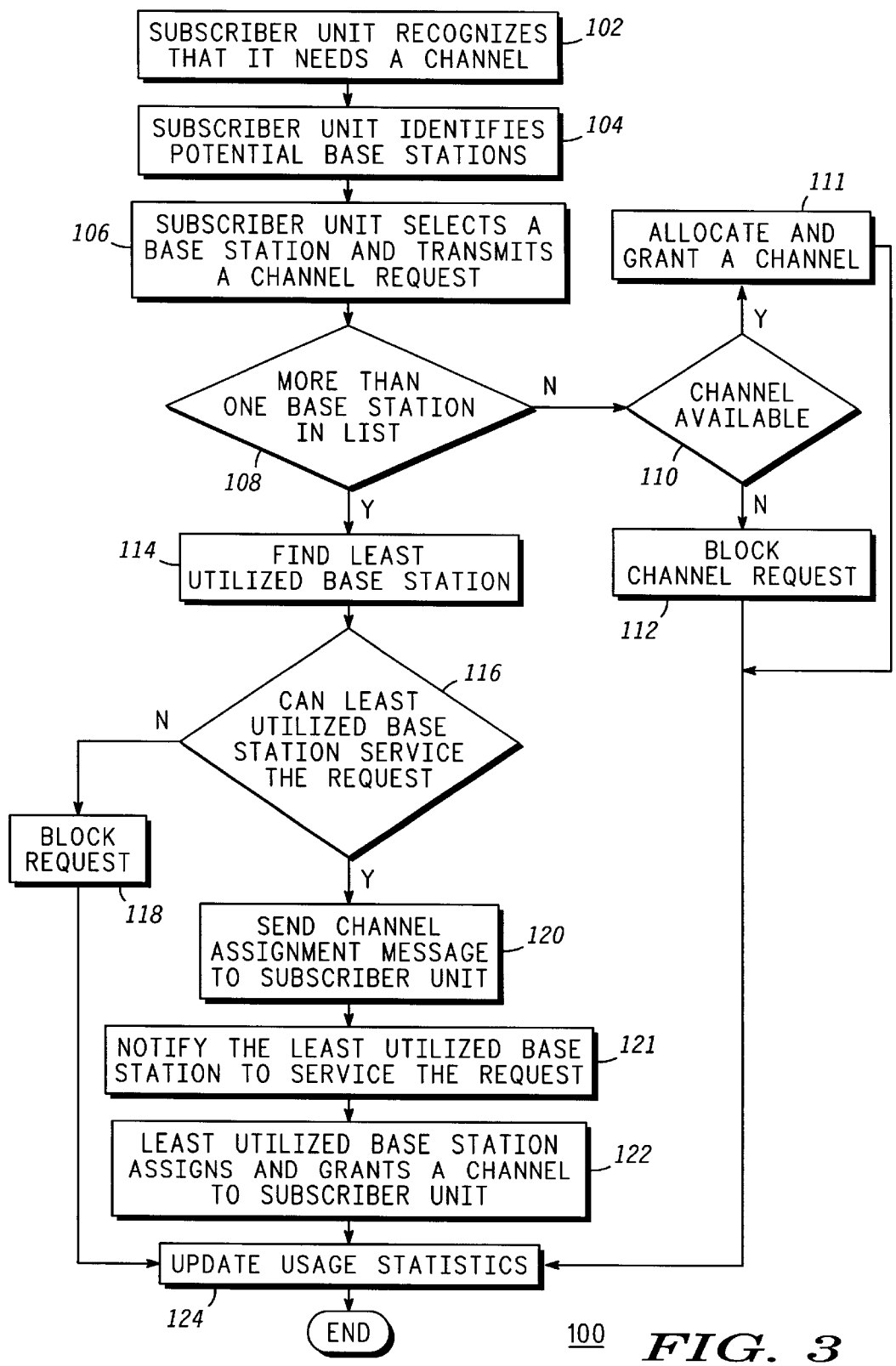
FIG. 3 shows a flowchart of a method for making dynamic channel assignment according to a preferred embodiment of the present invention.

FIG. 3 shows a flowchart of method 100 for making dynamic channel assignment according to a preferred embodiment of the present invention. It provides a systematic means for dynamically matching the available channel resources with the actual traffic demand as a function of time. This enables the system to handle significantly more traffic than with pure static routing or channel management schemes. Method 100 may be used in systems where at least one of the following conditions are true: (1) the number of channels available for assignment varies over time; or (2) the actual demand (i.e., offered subscriber traffic) for channels varies over time.

According to FIG. 3, method 100 begins in step 102 once a subscriber unit recognizes that it needs a channel. Next, the subscriber unit identifies in step 104 potential base stations (e.g., satellites) that can provide a channel for local access. Whatever process is used for identifying the potential base stations is well known to those of ordinary skill in the art and involves, for example, choosing base stations having acceptable signal strength above a threshold value with minimal signal degradation. After the subscriber unit identifies the potential base stations in step 104, the subscriber unit in step 106 selects a base station based on such criteria for example, as the base station's location and signal strength, and transmits a channel request to the selected base station. The subscriber unit's channel request arrives at the selected base station. The channel request includes a list of all candidate base stations (or satellites) that could service the subscriber unit's request for a channel.

On receipt by the base station of the channel request, the base station uses its knowledge of its own state, its neighbor states, and the base station candidate list to make a decision whether to (1) accept the channel request, (2) designate one of the members of the base station candidate list to accept the request, or (3) block or reject the channel request. According to step 108 of FIG. 3, if the base station candidate list has only one element (meaning that the base station which received the channel request is the only base station that can service the channel request), then the base station which received the channel request from the subscriber unit will accept or reject the channel request in step 110 depending on whether it has an available channel. If the base station determines that a channel is available in step 110, the base station will allocate and grant in step 111 a channel to the subscriber unit. Otherwise, the base station blocks or rejects the channel request in step 112. Thereafter, the base station updates its usage statistics in step 124 and method 100 ends.

Figure 4:
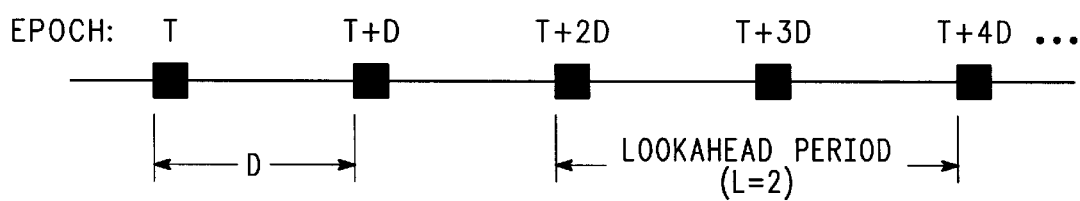
FIG. 4 shows an example of time epochs and a look-ahead period.

If the base station candidate list includes multiple base stations (meaning more than one base station can service the channel request), the base station which received the channel request determines in step 114 what base station is the least utilized base station. By determining the least utilized base station, method 100 finds what candidate base station is best suited to service the channel request. There may be many ways to determine what base station is the least utilized. In the preferred embodiment, the first step is to compute the utilization of each base station in the base station candidate list based on state information about link usage. Link usage may include for example, such information as the number of channels available for use at time T and the number of channels actually in use at time T. As shown in FIG. 4, time is structured as a sequence of intervals, each of duration D seconds. For each candidate base station in the base station candidate list, utilization is equal to the number of channels actually in use divided by the number of channels available for use. By comparing the utilization number associated with each of the candidate base stations, the smallest utilization number indicates which base station is the least utilized among the set of base stations.

Concurrently with the execution of the steps in method 100, base stations are passing status information between neighboring base stations at periodic intervals of time D. The status information includes for example, the number of channels available for use at time T, the number of channels actually in use at time T, and the allocation of the number of channels available for use during a specified number (L) of future time periods. In FIG. 4, an example of L=2 (look-ahead period is equal to two future time periods) is shown. This information is important for determining which base station is the least utilized base station.

In step 116 of FIG. 3, the least utilized base station is notified by the base station which received the channel request to determine whether it can service the channel request. This is based on whether the utilization number is below a predetermined threshold. For example, the base station may determine that its upper threshold is 90% (i.e., base station is at 90% of caller capacity). Any channel requests that exceed the maximum utilization threshold will be denied or blocked in step 118, and method 100 terminates after updating its usage statistics in step 124. If the least utilized base station can service the channel request, the least utilized base station sends a message to the subscriber unit informing it that the channel request will be serviced by the least utilized base station.

The least utilized base station may be the base station which received the subscriber unit's channel request, or it may be a neighboring base station. If the base station is the receiver of the channel request and is also the least utilized member of the base station candidate list, the base station sends in step 120 a channel assignment message to the subscriber unit informing the subscriber unit that it will service the channel request. If the least utilized base station is a neighbor of the base station which received the request, the channel request will be serviced by the neighbor base station. In this case, the base station receiving the channel request informs the subscriber unit in step 120 that its channel request will be serviced by the least utilized base station. Then, a message is sent in step 121 by the base station which received the channel request to the least utilized base station notifying it to service the channel request.

If the least utilized base station can service the channel request in step 116 of FIG. 3, the least utilized base station assigns in step 122 a channel for the subscriber unit and informs the subscriber unit of the channel assignment. The subscriber unit synchronizes its communication to the base station and communication begins. Synchronization and communication techniques and are well known to those of ordinary skill in the art. Following synchronization, the least utilized base station updates its usage statistics in step 124 and method 100 ends.

All of the base stations execute the same decision policy in a mutually, consistent manner and periodically exchange their state information as described above. Additional variations on the use of the state information are possible. An alternative variation for selecting the least utilized base station is to select the base station having the greatest value of subtracting the number of channels available for use from the number of channels actually in use. The base station having the greatest subtraction value will be designated to service the channel request. Moreover, if there is a tie, then the base station having the largest number of channels available for use will service the channel request.

Another variation in selecting which least utilized base station will service the channel request is to delete from the base station candidate list each member whose available caller resources decreases over the next future time periods. The least utilized base station is chosen based on a utilization value (computed either from the percentage or subtraction values) associated with each base station remaining on the base station candidate list.

It will be appreciated by those skilled in the art that the present invention dynamically adjusts available channels to actual traffic demand in a way that more subscriber traffic is handled than with pure static schemes. The present invention overcomes the deficiencies of prior methods and significantly increases system utilization by using demand-dependent and dynamic channel management.

Accordingly, it is intended by the appended claims to cover all modifications of the invention which fall within the true spirit and scope of the invention.

What is claimed is:

1. A method for dynamically assigning a channel, comprising the steps of:

a) a subscriber unit making a channel request to a receiving satellite, b) the receiving satellite receiving the channel request;

b$^1$) the receiving satellite storing a candidate list of multiple satellites;

c) the receiving satellite determining what satellite is a least utilized satellite;

c$^1$) notifying by the receiving satellite the least utilized satellite of the channel request; and d) the least utilized satellite servicing the channel request.

2. The method as recited in claim 1, wherein step (a) includes the steps of:

a1) the subscriber unit recognizing a need for a channel;

a2) the subscriber unit identifying potential satellites that can provide a channel; and a3) the subscriber unit selecting the particular moving satellite.

3. The method as recited in claim 2, wherein step (a1) includes the sub-step of the subscriber unit needing the channel to make a call to another subscriber unit.

4. The method as recited in claim 2, wherein step (a2) includes the sub-step of the subscriber unit identifying potential moving satellite based on acceptable signal strength and minimal signal degradation.

5. The method as recited in claim 2, wherein step (a3) includes the sub-steps of:

the subscriber unit selecting the particular moving satellite from a list of moving satellite according to the moving satellite having a strongest signal strength and minimal signal degradation; and the subscriber unit transmitting the channel request to the particular moving satellite.

6. The method as recited in claim 1, wherein step (c) includes the steps of:

c1) the moving satellite determining from the channel request if more than one moving satellite could service the channel request; and c2) the moving satellite servicing the channel request if the channel request only includes the moving satellite.

7. The method as recited in claim 6, further comprising the steps of:

c3) the moving satellite determining whether a channel is available;

c4) the moving satellite allocating and granting the channel to the subscriber unit if the channel is available; and c5) the moving satellite denying the channel request if the channel is not available.

8. The method as recited in claim 1, wherein the channel request includes a plurality of moving satellites, and wherein step (c) includes the steps of:

c1) the moving satellite determining from the channel request if more than one moving satellite could service the channel request; and c2) the moving satellite determining the least utilized moving satellite based on state information of link usage of each of the moving satellites.

9. The method as recited in claim 1, wherein step (c) includes the step of the moving satellite determining the least utilized moving satellite based on a number of channels available for use at a certain time and a number of channels actually in use at the certain time for each of the moving satellites.

10. The method as recited in claim 1, wherein the channel request includes a plurality of moving satellites, and wherein step (c) includes the step of the moving satellite determining the least utilized moving satellite based on a number of channels available for use at a certain time divided by a number of channels actually in use at the certain time for each of the moving satellites.

11. The method as recited in claim 1, wherein step (c) includes the step of:

c1) the moving satellite notifying the least utilized moving satellite to service the channel request.

12. The method as recited in claim 11, wherein step (c) further includes the steps of:

c2) the least utilized moving satellite determining whether a channel is available;

c3) the least utilized moving satellite allocating and granting the channel to the subscriber unit if the channel is available; and c4) the least utilized moving satellite blocking the channel request if the channel is not available.

13. The method as recited in claim 1, further comprising the step of the least utilized moving satellite updating usage statistics.

14. The method as recited in claim 1, further comprising the step of passing state information between adjacent moving satellites.

* * * * *